Jan. 2, 1968  L. P. HERRINGTON  3,360,989

DRIVEN ANEMOMETER

Filed Dec. 10, 1965

INVENTOR
LEE P. HERRINGTON

BY *Hurwitz & Rose*

ATTORNEYS

United States Patent Office 3,360,989
Patented Jan. 2, 1968

3,360,989
DRIVEN ANEMOMETER
Lee P. Herrington, Annandale, Va., assignor to Melpar, Inc., Falls Church, Va., a corporation of Delaware
Filed Dec. 10, 1965, Ser. No. 512,971
8 Claims. (Cl. 73—229)

ABSTRACT OF THE DISCLOSURE

A wind measuring device employing a cup-type anemometer rotatably driven by a motor at a constant speed and in a direction opposite to that in which it is rotated by the wind. The rotational velocity of the anemometer is converted to a feedback sginal which maintains the motor speed constant by controlling the power applied to the motor. The power applied to the motor is monitored as a function of wind velocity.

---

The present invention relates generally to apparatus for sensing and indicating the time rate of flow of fluids The invention is particularly useful in meteorological applications where it is desirable to accurately measure extremely low rates of air flow, or wind speed.

Atmospheric properties range from those, such as cloud types and cover, that are estimable by competent observers, to those, such as temperature, pressure, and wind speed and direction, that require measurement by some form of instrumentation. For example, wind speed measurements are made using anemometers, which may, however, vary widely in structure, operation and accuracy. In one of the earliest known anemometers a plate is mounted or suspended for movement relative to a scale calibrated in terms of wind velocity. When wind pressures, ranging in direction from oblique to normal with respect to the plane of the plate, are present, the plate is deflected accordingly and wind speed may be read directly by an observation of registry between plate and scale indicia. In another type of anemometer a set of semispherical cups are mounted on the spokes or vanes of a wheel-like structure having a vertically oriented axis of rotation. The presence of wind forces the cups and wheel to rotate, and instrumentation is provided to convert the number of rotations in a given time interval to a measure of wind speed.

It will be recognized that anemometers of the above-described type depend, for accuracy of measurement, largely upon the implementation of low inertia, low friction assemblies, and that in any event precise measurements are unattainable where extremely low wind speeds, on the order of 0.1 to 0.5 miles per hour (m.p.h.), are involved.

It is therefore a primary object of the present invention to provide an anemometer which is capable of accurate measurement of very low wind speeds.

Briefly, in accordance with the present invention, low wind speeds are accurately measured by driving an anemometer, having an assembly adapted to rotate under the influence of wind, in a direction opposite that attributable to the forces exereted by the wind components under observation. For example, if the rotatable assembly of the anemometer is arranged for clockwise rotation under the influence of wind, the assembly is driven in a counter-clockwise direction by a suitable driving element. In this manner the starting friction of the rotatable assembly is overcome and does not thereafter appear as a critical factor in the measurement. By maintaining constant angular velocity of the rotatable assembly through use of a feedback arrangement capable of sensing and of correcting or of attempting to correct for any added load on the driving element caused by the wind, the variations in power required to provide the constant angular velocity may be correlated as measurements of wind speed. It will be noted that such an arrangement is responsive to very low wind speeds as well as to very slight variations in wind speed, and is characterized by accuracy of measurement without the disadvantages of delicacy and complexity heretofore required in precision anemometers used in micrometeorology.

Accordingly, it is a further object of the present invention to provide a simple yet rugged instrument for use in micrometeorology.

Another object of the invention is to provide a driven anemometer for very low wind speed measurements.

Yet another object of the present invention resides in the provision of an instrument adapted to respond to extremely low fluid flow rates in a rapid and accurate fashion.

It is a still further object of the present invention to provide devices for measuring fluid flow rates, such as low velocity movement of air, wherein a sensing element is driven and maintained at a constant speed by the comparison of sensing element motion attributable to the controlled driving and to the oppositely-influencing fluid flow and by appropriate adjustment of the controlled driving to overcome the retarding effect of the fluid flow.

Another object of the present invention to provide apparatus for the accurate measurement of extremely low time rates of flow of fluids and wherein error-producing effects of friction are substantially eliminated.

The above and still further objects, features and attendant advantages of the present invention will become apparent from a consideration of the following detailed description of one specific embodiment thereof, especially when taken in conjunction with the accompanying drawing in which.

Figure 1:
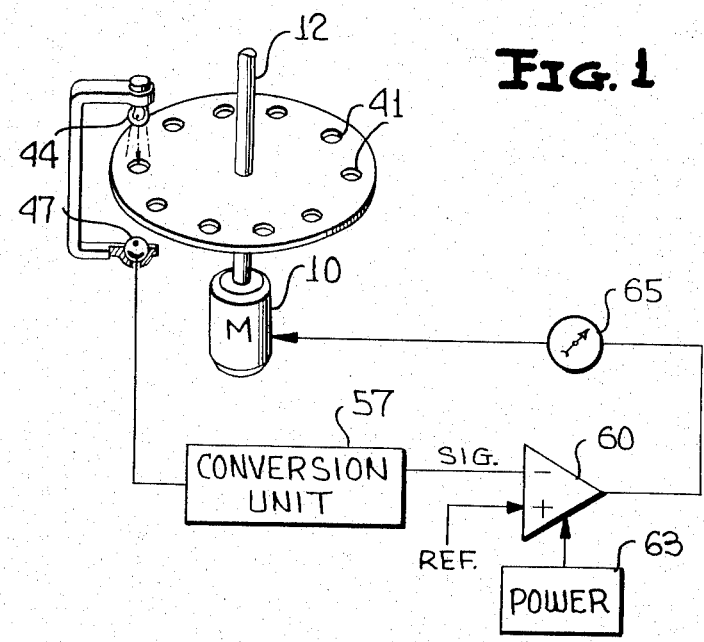
FIGURE 1 is a diagram of one embodiment of suitable mechanical and electrical structure for devices in accordance with the invention.

Referring now to FIGURE 1, an exemplary form of metering instrument according to the present invention includes a motor 10 utilized to drive a shaft 12 having a disk 15 mounted thereon. Motor 10 may be of any conventional type, either A-C or D-C, depending respectively upon the desired type of input power supplied to its operating terminals, and adapted to rotate shaft 12 at an angular velocity which depends upon the power applied thereto. Shaft 12 is coupled, directly or through a conventional drive train, to a rotatable element (not shown) so located as to be deflected and rotated under the influence of a moving fluid, such as wind, to which the element is subjected.

Figure 2:
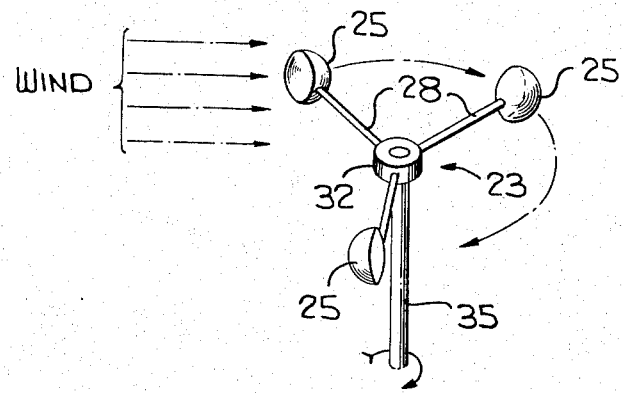
FIGURE 2 is a perspective view of one conventional form that the rotatable element of the device of FIGURE 1 may take for the measurement of wind speed.

The rotatable or sensing element may comprise any of the known devices customarily employed for such purpose, according to the type of fluid whose movement is to be sensed. In one illustrative form, convenient for the measurement of wind speed, the sensing element comprises a conventional cup-type anemometer 23 (FIGURE 2) wherein each of a set of semispherical cups 25 is mounted at the end of a respective vane 28. The vanes project radially in symmetrical array from an axle 32 having a vertically oriented axis corresponding to the axis of shaft 35, to which the axle is coupled. Thereby, the difference in force between that applied to the cup open to the wind and that applied to the backward cups constitutes a driving force which tends to rotate the assembly, and hence shaft 35, in a clockwise direction, for example, in the embodiment shown. Shaft 35 may be coupled in any convenient manner to, or may be an extension of, shaft 12, so that as shaft 12 is rotated in a counter-clockwise direction by motor 10 the opposite rotational tendency of assembly 23 under the influence of wind creates an additional load on the motor.

Disk 15 is coupled to shaft 12 for rotation therewith, and includes a plurality of light-passing apertures 41 disposed equiangularly on a common circle having an axis coincident with that of shaft 12. Apertures 41 are so arranged that, upon rotation of disk 15, each is successively interposed between a light source 44 and a photosensing element 47, both fixed with respect to the disk. Light source 44 may comprise a conventional lamp and associated reflector to project a beam of light toward the photosensor 47, for example a photocell; the beam being incident on the photocell when any one of apertures 41 is disposed in the optical path, and being interrupted when an opaque gap between apertures breaks the optical path. Hence, as disk 15 rotates, the photocell 47 is subjected to light pulsating at a frequency which depends upon the angular velocity of rotation of the disk, the latter operating as a light chopper.

Figure 3:
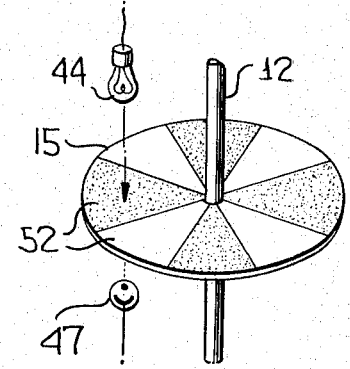
FIGURE 3 is a perspective view of a suitable transducer for converting mechanical motion to electrical signals in the device of FIGURE 1.

It will be understood that a variety of suitable rotational speed-sensing elements are available and will be apparent to those skilled in the art to which the invention pertains. For example, a conventional tachometer may be employed in place of disk 15, source 44 and photosensor 47, for measuring the angular velocity of shaft 12 and for producing an electrical output signal proportional thereto. Moreover, the optical sensing arrangement, which is preferred for its simplicity, economy, and reliability, may take on a wide variety of forms. Referring to FIGURE 3, chopper wheel (disk) 15 may include a plurality of radial segments 52, alternating in transparency and opacity to pass and interrupt the passage of the beam of light emanating from source 44, respectively.

The output terminals of photocell 47 are connected, through suitable conventional wave-shaping or signal conversion apparatus 57, if desired, to an operational amplifier 60, to which is also applied a reference signal for purpose of comparison. The nature of the reference signal will, of course, depend upon the particular rotational speed-sensing element employed, the type of output signal produced thereby, and whether and what type of signal conversion is effected prior to application to amplifier 60.

Power is applied to amplifier 60 from any suitable source 63, and the output of the amplifier is fed to the motor 10 to drive the motor at a constant angular velocity determined by the setting of the reference voltage and the gain of the feedback loop. A conventional measuring device 65, preferably having a meter scale calibrated in terms of fluid flow rate (here, wind speed) is inserted in the line between output of amplifier 60 and input terminals of motor 10.

In operation, the apparatus of FIGURE 1 is initially calibrated so that shaft 12 is driven at a constant angular velocity by motor 10 (i.e. a constant or invariant, power input to the motor) in accordance with the value of the reference voltage applied to amplifier 60 and the setting of the feedback gain, absent any other driving force (e.g., wind) on rotatable element 23. In other words, the combined effect of feedback, reference level, circuit gain and limiting mechanical factors results in rotation of disk 15 at a determinable equilibrium velocity. Under the influence of wind, cup assembly 23 will rotate, or tend to rotate, in a direction (say, clockwise) opposite the direction of rotation produced by the torque applied to shaft 12 by motor 10. In a conventional anemometer the speed at which the cup assembly begins to rotate under the influence of wind is primarily dependent upon the starting friction of the bearings. In accordance with the present invention, the bearings are in the motor, and by using the motor to produce a counter torque on the shaft, starting friction is overcome. The torque applied to the shaft as a result of the difference in force between that applied to the open cup or cups and the backward cups of assembly 23 by the wind constitutes an added load on the motor. Accordingly, the angular velocity of disk 15 is reduced from the value produced by the torque of the motor alone, resulting in a proportional decrease in the appropriate feedback parameter at the conversion unit 57. Assuming that the significant parameter of the reference signal is a prescribed voltage level, the feedback signal is converted to a proportional voltage level for application to operational amplifier 60. Reduction in feedback level is effective to produce an increase in the output level of the amplifier and thereby to increase the torque applied to shaft 12 by motor 10. Stated another way, the motor responds oppositely to the change in the feedback level, tending thereby to return the disk angular velocity to the initial equilibrium value. It will be recognized, however, that a new point of equilibrium is attained at an angular velocity somewhat below the initial velocity achieved in the absence of wind influence on cup assembly 23. The current delivered to motor 10 is a measure of the wind velocity and the scale of measuring device (e.g., ammeter) 65 may be calibrated in units of wind speed to obtain a direct reading thereof.

Where the present invention is employed in anemometer structures it is desirable that the rotatable element and associated coupling have a relatively long response distance (i.e., response distance equals time constant multiplied by mean wind speed), on the order of ten to fifteen feet.

An alternate method of measurement may be employed by driving the motor with constant input power and coupling the measuring unit to the shaft 12 to detect shaft speed which may be correlated to wind speed. However, the disadvantage of this method is that the resolution of the shaft speed measurement decreases in direct proportion to shaft speed. Hence, it is preferable to obtain the desired measurement from the error signal in the previously described manner.

While I have illustrated and described one specific embodiment of my invention, it will be apparent that various change and modifications of the specific details of construction shown and described may be resorted to without departing from the spirit and scope of the invention. Therefore, limitations should be placed on the invention only in accordance with the appended claims.

I claim:

1. Apparatus for measuring the time rate of flow of a fluid, comprising means responsive to the movement of said fluid rotatable at an angular velocity proportional to said movement, power means for rotationally driving said rotatable means at a constant angular velocity in the absence of said fluid movement and in a direction counter to that direction in which said rotatable means tends to rotate under the influence of said fluid movement, whereby oppositely acting torques are applied to said rotatable means by said power means and by said fluid movement to reduce the angular velocity of said rotatable means from said constant value, feedback means for generating a signal having a parameter proportional to the angular velocity of said rotatable means, said power means being responsive to deviations of said signal parameter from that existing during rotation of said rotatable means at said constant angular velocity to vary the power applied to said rotatable means in accordance therewith, and means for detecting the power applied to said rotatable means as a measure of the time rate of flow of said fluid.

2. The combination according to claim 1 wherein said rotatable means comprises a cup anemometer responsive to movement of air, and wherein the means for detecting correlates power applied to said rotatable means to wind speed.

3. The combination according to claim 1 wherein said feedback means includes a disk coupled to said rotatable means and rotatable therewith, said disk including a plurality of equi-spaced segments alternating respectively in transparency and opacity, a light source and a photo-electric transducer disposed substantially colinearly on opposite sides of said disk, and means for converting the output signal of said transducer to a form appropriate to produce a response thereto by said power means.

4. The combination according to claim 1 wherein said power means includes a motor, and a variable source of power for driving said motor, and wherein said rotatable means includes means coupled to the shaft of said motor for rotation therewith.

5. The combination according to claim 4 wherein said feedback means includes:
   a disk coupled to and rotatable with the shaft of said motor, said disk having regularly spaced portions alternating in transparency and opacity;
   a light source and photo-electric transducer disposed on opposite sides of said disk so that said spaced portions of said disk alternately vary the light received by said transducer as said disk rotates;
   conversion means responsive to the output signal of said transducer for providing a signal which varies smoothly as a function of the rotational velocity of said disk;
   a reference signal; and
   comparison means responsive to said smoothly-varying signal and said reference signal for controlling said variable source of power.

6. The combination according to claim 1 wherein said means for detecting includes display means for providing a visual indication of the fluid flow rate.

7. The combination according to claim 1 wherein said feedback means includes a reference signal, comparison means responsive to said reference signal and to said first-mentioned signal to vary the amount of power applied to said rotatable means.

8. The combination according to claim 1 wherein said feedback means includes a disk coupled to and rotatable with said rotatable means, said disk having a plurality of equi-spaced apertures formed therethrough and arranged in a concentric path about the axis of rotation of said rotatable means, a light source and a photo-electric transducer disposed substantially colinearly on opposite sides of said disk in intersecting relation with said path, and means for converting the output signal of said transducer to a form appropriate to produce a response thereto by said power means.

References Cited

UNITED STATES PATENTS

| | | | |
|---|---|---|---|
| 1,550,124 | 8/1925 | Thompson | 73—229 |
| 2,714,310 | 8/1955 | Jennings | 73—194 |
| 2,995,036 | 8/1961 | Goland | 73—194 |
| 3,224,271 | 12/1965 | Ichihara | 73—229 |

RICHARD C. QUEISSER, *Primary Examiner.*

JAMES J. GILL, *Examiner.*

J.W. MYRACLE, *Assistant Examiner.*